United States Patent
Balthazar de Lima Mussauer et al.

(10) Patent No.: US 11,567,847 B2
(45) Date of Patent: Jan. 31, 2023

(54) IDENTIFYING ANOMOLOUS DEVICE USAGE BASED ON USAGE PATTERNS

(71) Applicant: International Business Machines Corporation, Armonk, NY (US)

(72) Inventors: Renata Balthazar de Lima Mussauer, Rio de Janeiro (BR); Helio Leonardo Pinheiro e Mota, Ridgefield, CT (US); Rosana Rueda Elias, Campinas (BR); Rafael Risso Moleiro, Campinas (BR); Matheus Bitencourt Rangel Dantas, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 16/780,949

(22) Filed: Feb. 4, 2020

(65) Prior Publication Data
US 2021/0240588 A1 Aug. 5, 2021

(51) Int. Cl.
*G06F 11/34* (2006.01)
*G06F 11/30* (2006.01)
(Continued)

(52) U.S. Cl.
CPC ........ *G06F 11/3013* (2013.01); *G06F 3/0488* (2013.01); *G06F 11/3438* (2013.01);
(Continued)

(58) Field of Classification Search
None
See application file for complete search history.

(56) References Cited

U.S. PATENT DOCUMENTS

| 8,396,890 | B2 | 3/2013 | Lim |
| 8,862,092 | B2 | 10/2014 | Reitnour |

(Continued)

FOREIGN PATENT DOCUMENTS

| CN | 103957506 B | 12/2017 |
| WO | 2016172845 A1 | 11/2016 |

OTHER PUBLICATIONS

Agrawal et al.; Masquerade detection on GUI-based Windows systems; 2015; retrieved from the Internet https://www.researchgate.net/publication/277615996_Masquerade_detection_on_GUI-based_Windows_systems; pp. 1-10 as printed. (Year: 2015).*

(Continued)

*Primary Examiner* — Michael W Chao
(74) *Attorney, Agent, or Firm* — Daniel M. Yeates

(57) ABSTRACT

A computer-implemented method to identify unauthorized use of a device based on a usage pattern. The method includes tracking usage of a device, wherein the usage includes activity by a user interacting with the device. The method includes identifying a usage pattern, wherein the usage pattern is based on usage data. The method further includes generating, based on the usage pattern, a heatmap. The method includes predicting future usage of the device by the user, wherein the predicting includes generating a Markov chain of the predicted future usage. The method also includes determining actual usage is different than the predicted usage. The method further includes calculating, in response to determining the actual usage is different than the predicted future usage, a difference score. The method includes determining the difference score is above a difference threshold, and activating, in response to the difference score being above the difference threshold, an alert.

18 Claims, 5 Drawing Sheets

(51) Int. Cl.
   G06F 21/55      (2013.01)
   G06F 3/0488     (2022.01)
   G06F 17/18      (2006.01)
   G06F 21/31      (2013.01)
   H04L 9/40       (2022.01)

(52) U.S. Cl.
   CPC ............ *G06F 17/18* (2013.01); *G06F 21/316* (2013.01); *G06F 21/552* (2013.01); *H04L 63/102* (2013.01); *G06F 2201/84* (2013.01)

(56) References Cited

U.S. PATENT DOCUMENTS

| | | | |
|---|---|---|---|
| 9,536,072 | B2 | 1/2017 | Guedalia et al. |
| 9,959,399 | B2 | 5/2018 | Su |
| 10,089,637 | B2 | 10/2018 | Bredenberg et al. |
| 10,185,817 | B2* | 1/2019 | Gupta ................... G06F 21/36 |
| 10,423,766 | B2* | 9/2019 | Huang .................. G06F 21/60 |
| 11,470,102 | B2* | 10/2022 | Jones ................... G06F 21/554 |
| 2004/0143749 | A1 | 7/2004 | Tajalli et al. |
| 2009/0199296 | A1 | 8/2009 | Xie et al. |
| 2010/0192209 | A1* | 7/2010 | Steeves ................... H04L 63/08 726/7 |
| 2012/0137367 | A1* | 5/2012 | Dupont ................... G06F 21/00 726/25 |
| 2013/0055348 | A1* | 2/2013 | Strauss ................... G06F 21/40 726/3 |
| 2014/0179270 | A1 | 6/2014 | Anand |
| 2014/0317726 | A1* | 10/2014 | Turgeman ............. H04W 12/06 726/19 |
| 2015/0156084 | A1* | 6/2015 | Kaminsky ............... H04L 43/04 709/224 |
| 2015/0363582 | A1* | 12/2015 | Sheller ................... G06F 21/31 726/17 |
| 2016/0021117 | A1* | 1/2016 | Harmon .................. H04L 63/08 726/1 |
| 2016/0063503 | A1* | 3/2016 | Kobres ................... G10L 17/00 705/18 |
| 2016/0110528 | A1* | 4/2016 | Gupta ..................... G06F 21/31 726/19 |
| 2016/0171734 | A1* | 6/2016 | Colby .................... G06F 3/0484 345/634 |
| 2017/0140279 | A1* | 5/2017 | Turgeman ............... G06N 20/00 |
| 2017/0221064 | A1* | 8/2017 | Turgeman ............... G06F 21/31 |
| 2018/0069867 | A1* | 3/2018 | Grajek .................. H04W 12/065 |
| 2018/0268049 | A1* | 9/2018 | Youssefian ............. H04L 67/52 |
| 2018/0359270 | A1* | 12/2018 | Chari .................... H04L 63/102 |
| 2019/0294768 | A1* | 9/2019 | McMurdie ............. H04L 67/306 |
| 2020/0092314 | A1* | 3/2020 | Mital ................... G06F 21/6218 |
| 2020/0274894 | A1* | 8/2020 | Argoeti ............... H04L 63/1408 |
| 2022/0092159 | A1* | 3/2022 | Grajek ................ H04W 12/065 |
| 2022/0292543 | A1* | 9/2022 | Henderson ......... G06Q 30/0269 |

OTHER PUBLICATIONS

"Markov chain", From Wikipedia, the free encyclopedia, printed Nov. 26, 2019, 32 pages. https://en.wikipedia.org/wiki/Markov_chain.

"Examples of Markov chains", From Wikipedia, the free encyclopedia, printed Nov. 26, 2019, 4 pages. https://en.wikipedia.org/wiki/Examples_of_Markov_chains.

"Heat map", From Wikipedia, the free encyclopedia, printed Nov. 26, 2019, 5 pages. https://en.wikipedia.org/wiki/Heat_map.

Mell et al., "The NIST Definition of Cloud Computing", Recommendations of the National Institute of Standards and Technology, Special Publication 800-145, Sep. 2011, 7 pages.

Expert-Ul-Heat-Map-Fixation-Duration-of-Task-3, PNG Image, 1 page, printed Nov. 26, 2019. https://www.researchgate.net/profile/Andre_Calitz/publication/274309847/figure/fig5/AS:294677870858246@1447268087789/Expert-Ul-Heat-Map-Fixation-Duration-of-Task-3.png.

Ehatisham-Ul-Haq et al., "Authentication of Smartphone Users Based on Activity Recognition and Mobile Sensing", Sensors, MDPI, 2017, 31 pages, doi:10.3390/s17092043.https://pdfs.semanticscholar.org/19cc/8a9885918167d56a9ba2020dbf386fd0c9b5.pdf?ga=2.37293410.353322198.1566553555-499402524.1469091653.

Majeed et al., "Behaviour Based Anomaly Detection for Smartphones Using Machine Learning Algorithm", International conference on Computer Science and Information Systems (ICSIS'2014) Oct. 17-18, 2014 Dubai (UAE), 7 pages. https://pdfs.semanticscholar.org/4295/efb3cece6735d123fdc8ea61c362cdc7fe38.pdf.

Hu, "Using a Personalized Machine Learning Approach to Detect Stolen Phones", Master of Science in Computer Science, Thesis, Graduate School of Florida Institute of Technology, Dec. 2015, 45 pages. https://cs.fit.edu/~pkc/theses/hu15.pdf.

Levenson, "Touch Heatmaps: The Future Of Mobile App Usability Testing", UsabilityGeek, Aug. 21, 2017, 9 pages. https://usabilitygeek.com/touch-heatmaps-mobile-app-usability-testing/.

Usability Geek, Image, 1 page, printed Feb. 2, 2020. https://usabilitygeek.com/wp-content/uploads/2019/03/bad-mobile-ads-11-heatmap.jpg.

* cited by examiner

IDENTIFYING ANOMOLOUS DEVICE USAGE BASED ON USAGE PATTERNS

BACKGROUND

The present disclosure relates to device security, and, more specifically, identifying anomalous behavior based on usage patterns.

Smartphones and other portable computing devices are becoming commonplace. There is an ever-growing number of applications that can be used for recreation, business, communications, and more all from a single device. Some of these applications require the device to be unlocked for long periods of time.

SUMMARY

Disclosed is a computer-implemented method to identify unauthorized use of a device based on a usage pattern. The method includes tracking, by a usage manager, usage of a device, wherein the usage includes activity by a user interacting with the device. The method also includes identifying, based on the usage, a usage pattern, wherein the usage pattern is based on usage data. The method further includes generating, based on the usage pattern, a heatmap, wherein the heatmap represents a relative probability of the user interacting with a portion of the device, and the heatmap is based on the usage data. The method includes predicting future usage of the device by the user, wherein the predicting includes generating a Markov chain of the predicted future usage. The method also includes determining actual usage is different than the predicted future usage. The method further includes calculating, in response to determining the actual usage is different than the predicted future usage, a difference score. The method includes determining the difference score is above a difference threshold, and activating, in response to determining the difference score is above the difference threshold, an alert. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1:
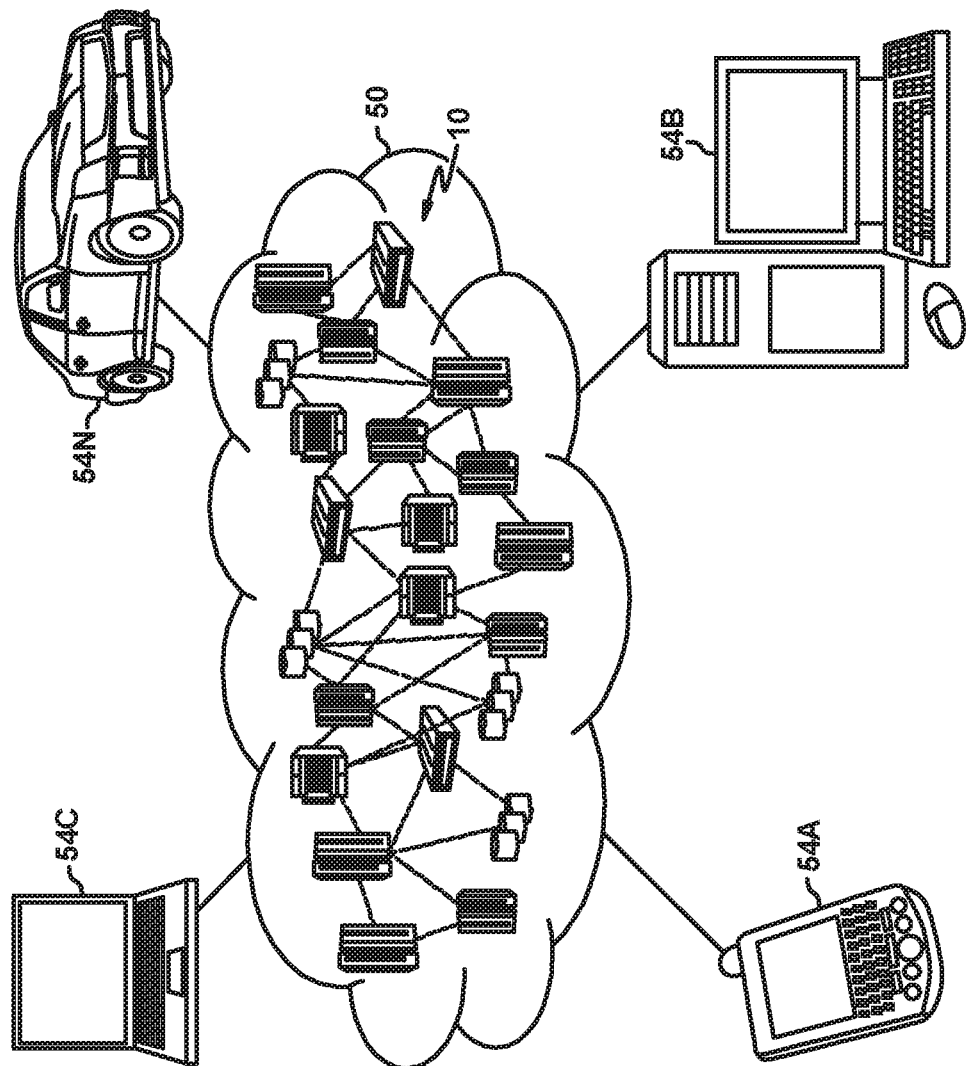
FIG. 1 depicts a cloud computing environment according to an embodiment of the present invention.

Smartphones and other portable computing devices are becoming commonplace. There is an ever-growing number of applications that can be used for recreation, business, communications, and more, all from a single device. Some of these applications require the device to be unlocked for long periods of time. This can lead to a third party gaining unauthorized access to smartphone's applications (e.g., phone left at a restaurant, phone stolen, etc.). In a short amount of time, the third party can gain access to personal (e.g., home address, work address, etc.), financial (bank account numbers, etc.), messaging (impersonate user), and/or other applications/data.

In order to better protect information, embodiments of the present disclosure may generate a user usage pattern, predict user behavior, determine behavior is not consistent with the user profile, and initiate an alert to prevent undesirable results.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network
Cloud Computing in General It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
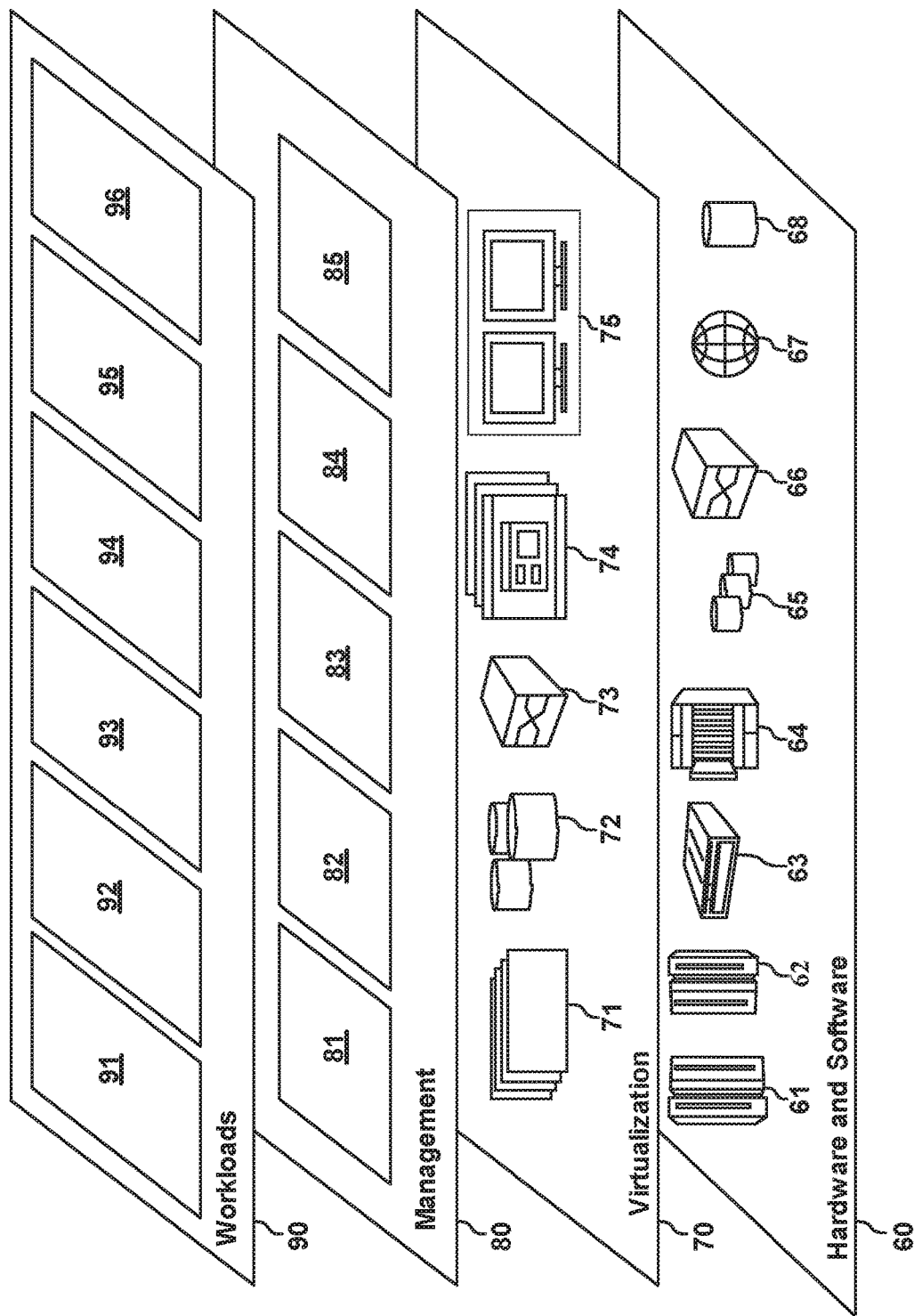
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
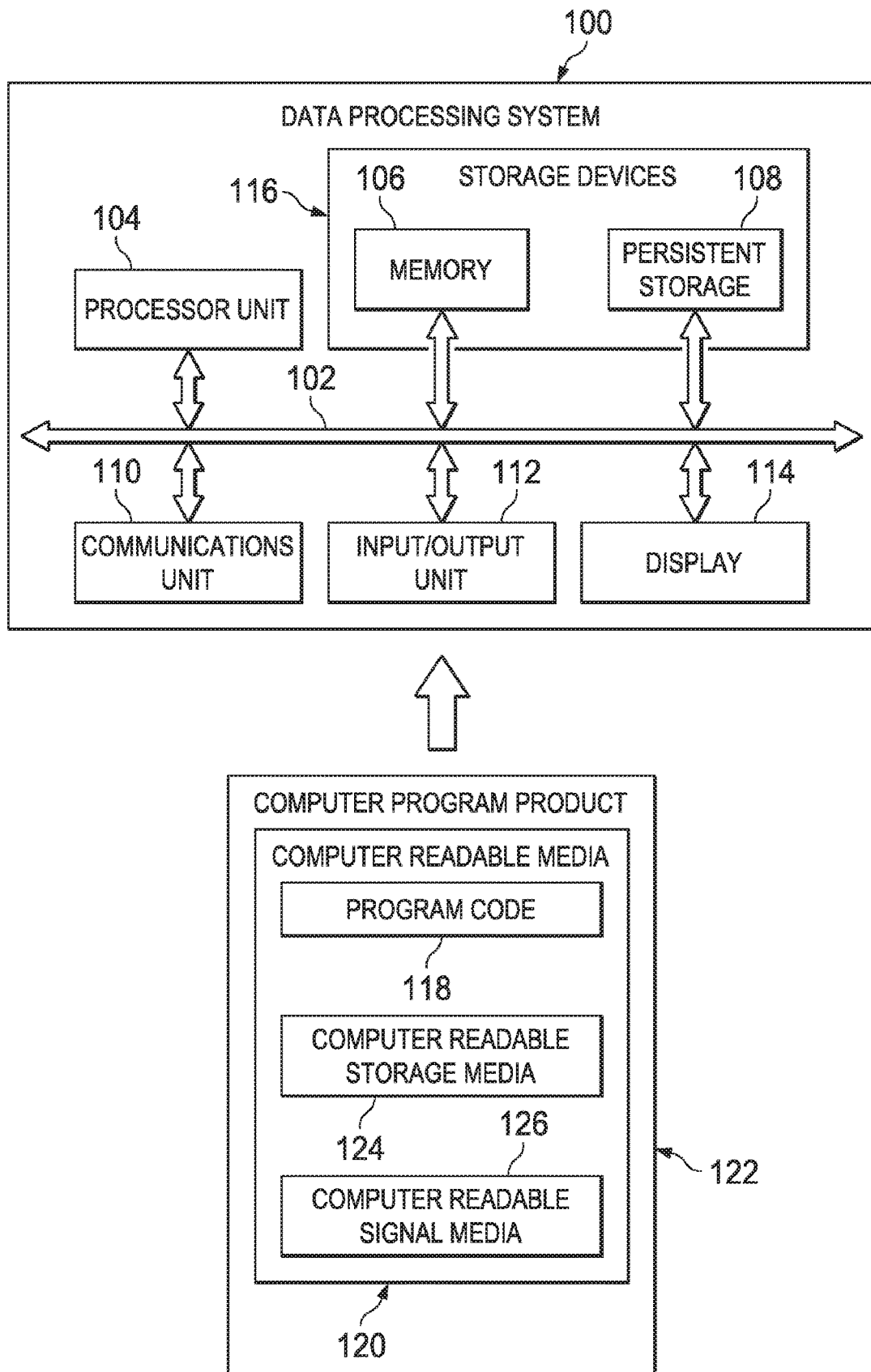
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Usage Monitoring System

Generally, electronic communication is based on trust. There is a degree of confidence a user has when they receive a communication from a seemingly known contact. For example, when an email is received by an inbox, a user generally assumes the source is as indicated, especially if it is from a known/frequent contact. However, if an unauthorized user gains access to that account, there is no immediate method for the recipient to identify a fraudulent message. The risk of an undesirable consequence from unauthorized access increases with the increased use of portable computing devices. For example, assume a parent receives a message from a child asking to send money to a repair shop to pay for car repairs. That request, if from the actual child, is not unexpected and may be standard. However, if an unauthorized user had access to the sending device, the parent may inadvertently send money to a bad actor.

Thus, embodiments of the present disclosure monitor a user usage of their device, identify one or more patterns, predict future actions based on the past actions using a Markov chain, then monitor for anomalous behavior. Anomalous behaving may indicate an unauthorized entity has gained access to the device. The usage system may alert potential contacts to prevent and assist in preventing undesirable results.

A Markov chain is a system that predicts future actions based on a current state. It uses probabilities to predict outcomes of a current event. The probability of each future event is fixed regardless of the path to the current state. Markov chains may be utilized to predict future events up to a degree of confidence, based on a current state.

Markov chains can be developed by analyzing a group of events and determining which states precede other states, or which states will be subsequent to a current state based on the current set of conditions. Human users generally develop habits and/or patterns when interacting with their devices (e.g., smartphones, personal computers, etc.).

Embodiments of the present disclosure distinguish between two different users of a device based on a user's usage patterns. For example, an authorized user (e.g., a device owner) and an unauthorized user (e.g., a mobile phone is stolen by a bad actor). In some embodiments, user inputs are received and analyzed and used as the basis for future actions. If a future action varies from a predicted action, that may signal an unauthorized user has access to the device.

Embodiments of the present disclosure monitor a user's usage pattern on a device. This may be done by capturing a series of snapshots. The snapshot represents the current state of the device. The captured snapshots of data may include current inputs (e.g., activated cells on a touch screen), geographic location, time of day, applications running on the device, day of the week, and/or other similar data.

Embodiments of the present disclosure analyze the series of snapshots to develop usage patterns. In some embodiments, the usage patterns include and/or are based on one or more heatmaps. The heatmap indicates which portion of the device received more input relative to other portions of the device. The portion may correlate with activation sites on the device. The portion may also include patterns. Different heatmaps may be generated for different conditions. (e.g., locations, open applications, etc.). For example, a first heatmap may be generated while a first application is running, a second heatmap generated while an online shopping application is open, and a third and fourth for each of the two applications at a different location.

Embodiments of the present disclosure predict a user's future behavior based on the usage patterns and/or the heatmaps. In some embodiments, the prediction includes generating a Markov chain. The Markov chain may indicate a future action (e.g., input), based on the current set of conditions. In some embodiments, the prediction includes a likelihood and/or probability of the predicted action occurring.

Embodiments of the present disclosure calculate a difference score in response to behavior that is different than the predicted behavior. In some embodiments, the behavior score is correlated to the probabilities of the predicted actions. In some embodiments, the behavior score represents the likelihood the current user is different than the typical owner.

Embodiments of the present disclosure activate an alert in response to the difference score being above a predetermined difference threshold. The alert may be configured to notify certain contacts that the device may be compromised. For example, continuing the above example, after the parent receives the text request for a transfer of funds, the usage monitor system may send another message to the same parent indicating unusual behavior on the sending device. This gives the recipient a chance to investigate before unknowingly transferring money to a bad actor.

In some embodiments, the alert includes requesting additional verification from the current user. This may include locking the device and requiring a password/passcode and/or other verification (e.g., biometrics, etc.).

In some embodiments, a remote server acts as a backup for the data and/or generated heatmap. In some embodiments, the server receives a notification if the difference threshold is exceeded. The sever may also activate the alerts.

The aforementioned advantages are example advantages, and embodiments exist that can contain all, some, or none of the aforementioned advantages while remaining within the spirit and scope of the present disclosure.

Figure 4:
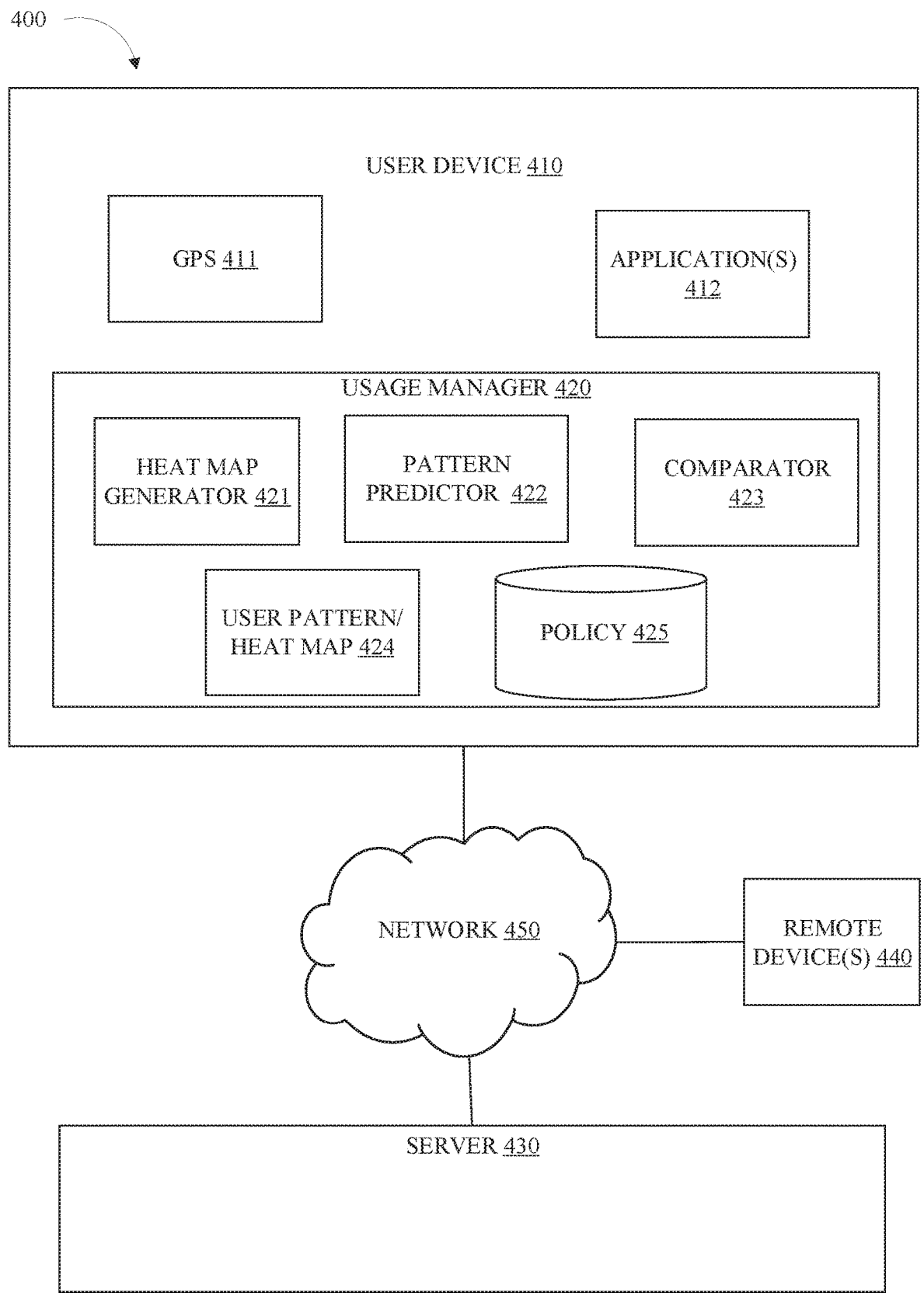
FIG. 4 illustrates a functional diagram of a computing environment suitable for operation of a usage manager, in accordance with some embodiments of the present disclosure.

Referring now to various embodiments of the disclosure in more detail, FIG. 4 is a representation of a computing environment 400, that is capable of running a usage manager in accordance with one or more embodiments of the present disclosure. Many modifications to the depicted environment may be made by those skilled in the art without departing from the scope of the disclosure.

Computing environment 400 includes user device 410, server 430, remote device 440, and network 450. Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between user device 410, server 430, remote device 440, and other computing devices (not shown) within computing environment 400. In some embodiments, user device 410, server 430, and remote device 440 may include a computer system, such as the data processing system 100 of FIG. 3.

User device 410 can be a standalone computing device, a management server, a web server, a mobile computing device, or any other electronic device or computing system capable of receiving, sending, and processing data. In other embodiments, user device 410 can represent a server computing system utilizing multiple computers as a server system, such as in a cloud computing environment. In some embodiments, user device 410 represents a computing system utilizing clustered computers and components (e.g., database server computers, application server computers, etc.) that act as a single pool of seamless resources when accessed within computing environment 400. In some embodiments user device 410 includes usage manager 420, GPS 411, and application 412.

GPS 411 can be any combination of hardware and/or software configured to identify to location of user device 410. Customer GPS 411 can be integrated into or separate from service application 412.

Application 412 can be any combination of hardware and/or software configured to perform a function (e.g., mapping application, messaging application, shopping application, etc.) on user device 410. In some embodiments, application 412 includes two or more separate applications.

Usage manager 420 can be any combination of hardware and/or software configured to determine a usage pattern, and/or anomalies in the usage pattern of user device 410. In some embodiments, usage manager 420 incorporates data from GPS 411 and/or application 412. In some embodiments, usage manager 420 includes heatmap generator 421, pattern predictor 422, comparator 423, heatmap 424, and policy 425.

Heatmap generator 421 can be any combination of hardware and/or software configured to generate heatmaps. The heatmap may indicate which portions of a U/I (e.g., screen) are utilized relative to other portions of the U/I. In some embodiments, the heatmap is generated by recording a series of snapshots. The snapshot records state data at the time of the snapshot. The stated data may include location information, application data (e.g., which applications are running on user device 410), user input, time of day, day of week, and other state data. The series of snapshots may be analyzed to determine user patterns and/or heatmaps. For example, if user device 410 includes a touchscreen, heatmap generator 421 may log each time an activation cell of the touch screen is activated. Each activation cell is correlated to a location on the U/I. Data relating to which cells are activated may be included in the snapshots.

In some embodiments, the heatmap is based on usage patterns of a user. A usage pattern may include inputs from the user into the device. Usage patterns may be developed/identified by analyzing the series of snapshots. For example, the analysis may show that a certain area on user device is activated much more frequently than a second area. Additionally, the analysis may show that if a third area is activated, then a fourth area will be subsequently activated.

In some embodiments, the heatmap incorporates the user's geographic location. The geographic location may be obtained from GPS 411. Location data may be included in the snapshots. In some embodiments, the location data is categorized based on the location. Categories may include, work, home, car, store, and/or other similar categories. In some embodiments, the heatmap is based on one or applications (e.g., application 412) running on user device 410. Application data may be included in the snapshots.

In some embodiments, heatmap generator 421 generates one or more heatmaps. The one or more heatmaps may be based on data in the snapshots. The one or more heatmaps may be based on which application(s) are running, physical location, time of day, day of the week, and other similar factors. For example, heatmap generator 421 may create a unique heatmap for each application 412 that is running. In another example, unique heatmaps may be generated based on the user's physical location (or location category). Thus, one heatmap may be used when the user is at home, another while at work, and still another while in a public place (e.g., store, restaurant, etc.).

Pattern predictor 422 can be any combination of hardware and/or software configured to guess how the user will interact with user device 410. In some embodiments, pattern predictor 422 utilizes a Markov chain to predict patterns. The predictions may be based on one or more of user location, application running, days of the week, time of day, and/or other similar factors. In some embodiments, the prediction includes one or more probabilities. The probabilities are related to the likelihood that a specific action will occur based on the current state. In some embodiments, the prediction may include more than one predicted action, each action having a confidence score. In some embodiments, pattern predictor 422 generates a transition probability matrix. The matrix may be used to predict user behavior with the Markov chain, and/or may assist is generating the Markov chain.

Comparator 423 can be any combination of hardware and/or software configured to identify differences between the predicted pattern and the actual usage. In some embodiments, comparator 423 monitors inputs into user device 410. It may compare the received input to the predicted input. In some embodiments, comparator 423 determines differences between the predicted input and the received input. In some embodiments, comparator 423 generates a difference score. The difference score may represent the amount of divergence between the predicted and the actual input. In some embodiments, the difference score represents a likelihood that a current user is an unauthorized user. This may be a person who found, stole, or is otherwise unknown to the owner and who gained access to the device.

Heatmap 424 can be a collection of data that represents the relative use of user device 410. In some embodiments, heatmap 424 is used by pattern predictor 422 in predicting user actions. In some embodiments, heatmap 424 is adjusted based on one or more of running applications, location, time, and/or date. In some embodiments, heatmap 424 includes a analysis of inputs over a period of time correlated to a location of the input area.

Policy 425 can be a plurality of updatable options (or attributes) for operation of usage manager 420. In some embodiments, policy 425 includes notification information. In some embodiments, policy 425 includes threshold information. This allows for different variations from predicted patterns before an effect is triggered. For example, the threshold may be a 10% difference or a 20% difference. In some embodiments, there are multiple thresholds.

In some embodiments, policy 425 includes device state information. This may include locations, time, date, applications running, and other similar state information. There may be different thresholds for different states. For example, a threshold related to a banking application (high risk application) may be a relatively low difference score (low meaning a lower difference implies a higher likelihood the current user is not the authorized user), while a threshold related to a game application (low risk application), may have a relative high difference score (high meaning a higher difference implies a higher likelihood the current user is not the authorized user). Different thresholds may also be set for locations (e.g., home vs. work), day (e.g., weekday vs. weekend), time of day, and/or any other state, circumstance, and/or situational information.

In some embodiments, policy 425 includes remedial actions. Remedial actions may be actions taken in response to a difference value being above the threshold. In some embodiments, remedial action includes sending a notification. The notification may be sent to one or more remote devices 440. The notification may indicate to the recipient that user device 410 may have been compromised.

In some embodiments, the remedial actions include restricting the use of user device 410. This may include one or more of, closing an application, locking the device, asking for a key (e.g., passcode), biometric verification, providing a notification, and/or any other protective action.

In some embodiments, policy 425 includes exclusions. Exclusions are times when snapshots are not taken or when the data is not analyzed to generate heatmap 424. This may be for specific states (e.g., applications, locations, times, etc.). For example, one more application may be excluded from taking snapshots while the application is open, or while at a certain location. In some embodiments, usage manager 420 may be toggled on/off. For example, if a user takes user device 410 on a vacation, the generated heatmaps may be inadequate in the new environment. A user may select to disable the application for a period of time or indicate a new environment in which snapshots should be separately analyzed.

Server 430 can be any combination of hardware and/or software configured to store and manage usage manager 420 remotely. In some embodiments, server 430 provides a backup for data associated with usage manager 420 (e.g., heatmap 424, policy 425, etc.). In some embodiments, server 430 may be notified of a difference score being above a threshold. In some embodiments, server 430 can request and validate additional verification. For example, if usage manager 420 determines unauthorized usage of user device 410, server 430 may request a passcode from the current user, or send a message to a predetermined contact, and/or other remedial actions.

Remote device 440 can be of any of a number of different data processing systems including client computing devices, server computing devices, a tablet computer, laptop computer, telephone or other communication device, a personal digital assistant (PDA), or the like. In some illustrative examples, remote device 440 may be a portable computing device that is configured with flash memory to provide non-volatile memory for storing operating system files and/or user-generated data. In various embodiments, remote device 440 includes software, hardware, and other components to communicate, via network 450, to server 430, user device 410, and/or usage manager 420. In some embodiments, remote device 440 receives notification from usage manager 420. The notifications may be in response to usage manager 420 determining, with a probability above a predetermined threshold, that a person other than the uses is operating user device 410. In some embodiments, remote device 440 is a device that the user has access to (e.g., personal computer).

Figure 5:
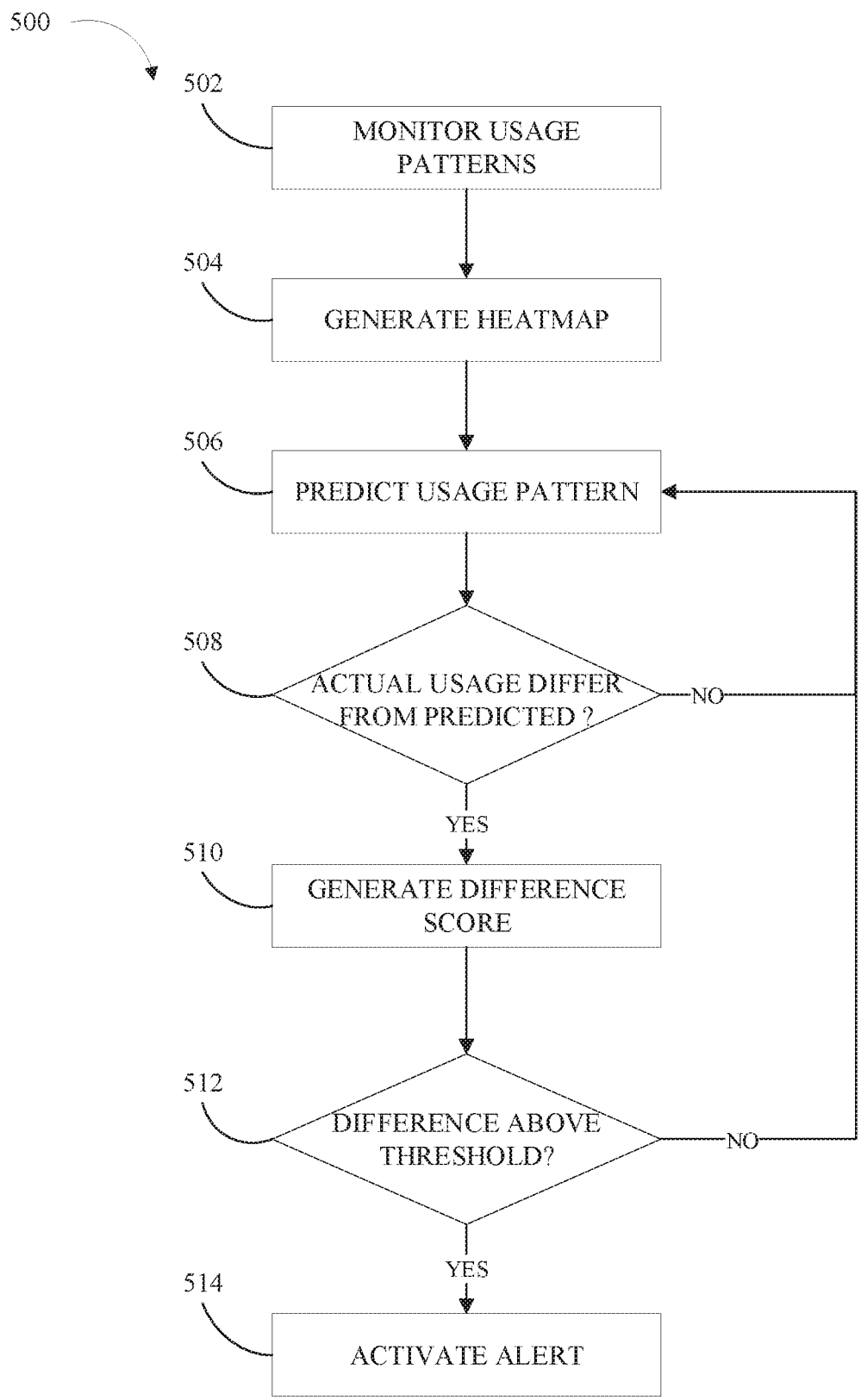
FIG. 5 illustrates a flow chart of an example method to identify atypical usage in a device, in accordance with some embodiments of the present disclosure.

FIG. 5 depicts a flowchart of an example method, method 500, for generating and monitoring usage patterns that can be performed in a computing environment (e.g., computing environment 400 and/or user device 410). One or more of the advantages and improvements described above for generating and monitoring usage patterns may be realized by method 500, consistent with various embodiments of the present disclosure.

Method 500 can be implemented by one or more processors, user device 410, usage manager 420, remote device 440 and/or a different combination of hardware and/or software. In various embodiments, the various operations of method 500 are performed by one or more of user device 410, usage manager 420, and/or remote device 440. For illustrative purposes, the method 500 will be described as being performed by usage manager 420.

At operation 502, usage manager 420 monitors usage patterns. The usage patterns may be a series of inputs and state data for user device 410. In some embodiments, monitoring includes taking a series of snapshots of data. The snapshot may include current inputs, time, date, location, running applications, and other similar data. In some embodiments, the snapshots are taken at constant interval (e.g. every 2 seconds). In some embodiments, the snapshots are taken in response to an input (e.g., user touching screen) or other event. Each snapshot may be saved. In some embodiments, the snapshot data is backed up on server 430.

At operation 504, usage manager 420 generates one or more heatmaps 424. In some embodiments, the heatmaps 424 are generated by heatmap generator 421. In some embodiments, the heatmaps are generated by analyzing user actions on user device 410. This may include identifying patterns of use. The heatmaps may be based on the series of snapshots. In some embodiments, the heatmap represents the portion of the device that receives input the most frequently, relative to different portions of the device interface. This may include which cells are activated on a touch, the location of a cursor, and/or other similar inputs.

At operation 506, usage manager 420 predicts a usage pattern 423. In some embodiments, the usage pattern 424 is generated by pattern predictor 422. In some embodiments the usage pattern 424 includes one or more subsequent actions. The subsequent actions may be predictions of a received input (e.g., location of touch screen input, running applications, physical location, etc.). In some embodiments, the usage pattern includes a Markov chain. The Markov chain predicts future states based on the current states. Each potential future state may be associated a probability for that state.

In some embodiments, operation 506 includes generating a transition probability matrix. A transition probability matrix can include a plurality of potential future actions and their associated probabilities.

At operation 508, usage manager 420 determines if usage is different than the predicted usage. In some embodiments, the determination is made based on the predicted pattern and the current usage. Current usage may include inputs received after the predictions are generated. In some embodiments, the difference is based on heatmap 424. In some embodiments, a difference is determined in response to an input that does not correspond to the one or more subsequent actions. If it is determined there is a difference (508: YES), then usage manager 420 proceed to operation 510. If it is determined there is no difference (508: NO), then usage manager 420 returns to operation 506.

At operation 510, usage manager 420 generates a difference score. In some embodiments, the score is generated in response to determining a difference. The difference score may correspond to the probability of subsequent events. For example, if an event A had a low probability of occurring, then it may have a large difference score. In some embodiments, the difference score is based on heatmap 424. In some embodiments, the difference score is based on location, running application, time of day, date, and/or any other additional data.

At operation 512, usage manager 420 determines if the determined difference is above a threshold. The threshold may be dependent on one or more of time, location, date, running application, and/or other factors. If it is determined there the difference score is above the threshold (512: YES), then usage manager 420 proceeds to operation 514. If it is determined the difference score is not above the threshold (512: NO), then usage manager 420 returns to operation 506.

At operation 514, usage manager 420 activates alerts. In some embodiments, activating alerts includes sending a message (e.g., SMS, email, etc.) to contacts. Contacts are saved in user device 410. The content of the message and the contacts may be stored in policy 425. In some embodiments, activating the alert includes requesting additional verification. The additional verification may include locking the device, requesting a key (e.g., password), require biometric feedback (e.g., retina scan, fingerprint, facial recognition, etc.) and/or any other verification. In some embodiments, activating the alert includes sending messages and additional verification from the user.

Computer Technology and Computer Readable Media

The one or more embodiments disclosed herein accordingly provide an improvement to computer technology. For example, an improvement to a search engine allows for a more efficient and effective search for information by the user. The ability to access stored information with which the user has interacted with in some manner, and allowing the weighting of the importance of this information to decay over time beneficially improves the operation of the search and benefits the user in that more pertinent results may be presented to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    tracking, by a usage manager, usage of a device, wherein the usage includes activity by a user interacting with the device;
    capturing a series of snapshots of a touchscreen on the device, wherein each snapshot includes data corresponding to a running application, a location, a time of day, and a set of inputs, and the set of inputs includes one or more activated cells on a touchscreen of the device;
    identifying, based on the usage and on the series of snapshots, a usage pattern, wherein the usage pattern is based on usage data;
    generating, based on the usage pattern, a heatmap, wherein the heatmap represents a relative probability of the user interacting with a location on a screen of the device relative to other locations on the screen, and the heatmap is based on the usage data;
    predicting future usage of the device by the user, wherein the predicting includes generating a Markov chain of the predicted future usage;
    determining, based on the heatmap, actual usage is different than the predicted future usage;
    calculating, in response to determining the actual usage is different than the predicted future usage, a difference score;
    determining the difference score is above a difference threshold; and
    activating, in response to determining the difference score is above the difference threshold, an alert.

2. The method of claim 1, wherein identifying the usage pattern includes analysing the series of snapshots.

3. The method of claim 1, wherein the heatmap is a first heatmap and the first heatmap is correlated to a first application, the method further comprising:
    generating a second heatmap, wherein the second heatmap is correlated to a second application.

4. The method of claim 1, wherein the user is an authorized user and the difference score represents a likelihood a current user is an unauthorized user of the device.

5. The method of claim 1, wherein the usage manager includes a policy, the policy including a set of policy attributes.

6. The method of claim 5, wherein a first policy attribute of the set of policy attributes includes a set of contacts to alert.

7. The method of claim 1, wherein the activating the alert includes sending a message to a set of contacts.

8. The method of claim 1, wherein activating the alert includes requesting verification from a current user.

9. The method of claim 1, wherein the device is a mobile device.

10. The method of claim 1, wherein the alert is a first alert and the difference threshold is a first difference threshold, the method further comprising:
    determining the difference score is above a second difference threshold; and
    activating, in response to determining the difference score is above the second difference threshold, a second alert.

11. The method of claim 1, wherein the alert is activated by a server.

12. The method of claim 11, wherein the alert includes a message to a second device, indicate the device is compromised.

13. A system comprising:
    a processor; and
    a computer-readable storage medium communicatively coupled to the processor and storing program instructions which, when executed by the processor, are configured to cause the processor to:
        track, by a usage manager, usage of a device, wherein the usage includes activity by a user interacting with the device;
        capture a series of snapshots of a touchscreen on the device, wherein each snapshot includes data corresponding to a running application, a location, a time of day, and a set of inputs, and the set of inputs includes one or more activated cells on a touchscreen of the device;
        identify, based on the usage and on the series of snapshots, a usage pattern, wherein the usage pattern is based on usage data;
        generate, based on the usage pattern, a heatmap, wherein the heatmap represents a relative probability of the user interacting with a location on a screen of the device relative to other locations on the screen, and the heatmap is based on the usage data;
        predict future usage of the device by the user, wherein the predicting includes generating a Markov chain of the predicted future usage;
        determine actual usage is different than the predicted future usage;
        calculate, in response to determining the actual usage is different than the predicted future usage, a difference score;
        determine the difference score is above a difference threshold; and
        activate, in response to determining the difference score is above the difference threshold, an alert.

14. The system of claim 13, wherein identifying the usage pattern includes analysing the series of snapshots.

15. The system of claim 13, wherein the heatmap is a first heatmap and the first heatmap is correlated to a first application, and the program instructions are further configured to cause the processor to:
    generate a second heatmap, wherein the second heatmap is correlated to a second application.

16. A computer program product, the computer program product comprising a computer readable storage medium having program instructions embodied therewith, the program instructions executable by a processing unit to cause the processing unit to:
- track, by a usage manager, usage of a device, wherein the usage includes activity by a user interacting with the device;
- capture a series of snapshots of a touchscreen on the device, wherein each snapshot includes data corresponding to a running application, a location, a time of day, and a set of inputs, and the set of inputs includes one or more activated cells on a touchscreen of the device;
- identify, based on the usage and on the series of snapshots, a usage pattern, wherein the usage pattern is based on usage data;
- generate, based on the usage pattern, a heatmap, wherein the heatmap represents a relative probability of the user interacting with a location on a screen of the device relative to other locations on the screen, and the heatmap is based on the usage data;
- predict future usage of the device by the user, wherein the predicting includes generating a Markov chain of the predicted future usage;
- determine actual usage is different than the predicted future usage;
- calculate, in response to determining the actual usage is different than the predicted future usage, a difference score;
- determine the difference score is above a difference threshold; and
- activate, in response to determining the difference score is above the difference threshold, an alert.

17. The computer program product of claim of claim 16, wherein identifying the usage pattern includes analysing the series of snapshots.

18. The computer program product of claim 16, wherein the heatmap is a first heatmap and the first heatmap is correlated to a first application, and the program instructions are further configured to cause the processing unit to:
- generate a second heatmap, wherein the second heatmap is correlated to a second application.

* * * * *